United States Patent [19]

Swanson

[11] 4,293,036

[45] Oct. 6, 1981

[54] SHEAR-THICKENING COMPOSITIONS

[75] Inventor: Billy L. Swanson, Bartlesville, Okla.

[73] Assignee: Phillips Petroleum Co., Bartlesville, Okla.

[21] Appl. No.: 110,439

[22] Filed: Jan. 8, 1980

Related U.S. Application Data

[62] Division of Ser. No. 868,965, Jan. 12, 1978, Pat. No. 4,212,747.

[51] Int. Cl.$^3$ .................. E21B 43/26; E21B 43/22
[52] U.S. Cl. ............................ 166/302; 166/283; 166/308
[58] Field of Search .................. 252/8.55 R; 166/283, 166/302, 308

[56] References Cited

U.S. PATENT DOCUMENTS

| | | | |
|---|---|---|---|
| 3,025,255 | 3/1962 | Lambuth | 260/29.3 |
| 3,074,897 | 1/1963 | Bradbury | 260/29.3 |
| 3,663,477 | 5/1972 | Ahearn | 252/311.5 |
| 3,747,681 | 7/1973 | Davis et al. | 166/308 X |
| 4,050,513 | 9/1977 | Wu et al. | 166/302 X |

*Primary Examiner*—Herbert B. Guynn

[57] ABSTRACT

Shear-thickening aqueous compositions useful as workover fluids in producing or injection wells, as water diversion agents and mobility control fluids in post-primary oil recovery operations, and as hydraulic fracturing fluids well stimulation treatments are provided comprising the reaction product formed from a high molecular weight polyalkylene oxide polymer and a synthetic resin produced from aldehydes and phenols in an alkaline environment.

6 Claims, No Drawings

SHEAR-THICKENING COMPOSITIONS

This application is a division of copending application having Ser. No. 868,965, filed Jan. 12, 1978, now U.S. Pat. No. 4,212,747.

This invention relates to shear-thickening fluid compositions. In accordance with another aspect, this invention relates to shear-thickening fluid compositions prepared from a high molecular weight polyalkylene oxide polymer and a synthetic resin of an aldehyde and a phenol which composition is prepared in an alkaline environment. In accordance with a further aspect, the shear-thickening aqueous compositions of the invention are useful as workover fluids in producing or injection wells, as water diversion agents and mobility control fluids, and as hydraulic fracturing fluids.

Accordingly, an object of this invention is to provide novel shear-thickening fluid compositions.

A further object of this invention is to provide shear-thickening fluid compositions having utility in the treatment of subterranean formations.

A further object of this invention is to provide shear-thickening fluid compositions having utility in oil recovery operations.

Other objects and aspects, as well as the several advantages of the invention, will be apparent to those skilled in the art upon a reading of the specification and the appended claims.

In accordance with the present invention, a novel shear-thickening fluid composition is prepared by contacting a high molecular weight polyalkylene oxide polymer, such as polyethylene oxide, with a synthetic resin comprising the reaction product of an aldehyde with phenolic components, such as phenol and/or resorcinol, in the presence of aqueous alkali.

In accordance with another embodiment, the shear-thickening inventive compositions can be prepared by contacting phenolic component(s), aldehyde, and polyalkylene oxides in aqueous solution under suitable reaction conditions.

The inventive compositions described herein containing water, a high molecular weight polyalkylene oxide, and, e.g., a phenolformaldehyde synthetic resin, are highly viscoelastic, i.e., such mixtures are fluid in a quiescent state but assume a gel-like character on agitation. After agitation is stopped, the gel-like character disappears and the composition returns to the original fluid state. Fluids exhibiting such shear-thickening behavior are well recognized in the art and are useful as workover fluids in producing or injecting wells, as water diversion agents and mobility control fluids in postprimary oil recovery operations, and as hydraulic fracturing fluids in well stimulation treatments.

As water diversion agents and mobility control fluids the inventive compositions can be injected at so-called injection wells, respectively, to correct the permeability profile of a formation or for mobility control in post-primary oil recovery operations. Said compositions can function as permeability correction agents by temporarily plugging "thief zones" (high permeability areas), and thus direct the subsequently injected drive fluids to the less permeable, relatively oil-rich zones. The effectiveness of such agents is reflected by the magnitude of the increase observed in the oil-to-water ratio at surrounding production wells. Said compositions can function as mobility buffers, e.g., in surfactant flooding by injecting said compositions as viscous slugs to push the previously injected surfactant slug and recovered oil to a producing well. The viscosity of the mobility control fluid relative to that of the surfactant slug is such that little or no fingering of said slug into said surfactant slug takes place.

Hydraulic fracturing is commonly employed to increase the production of fluids from subterranean formations. Hydraulic fracturing comprises the injection of a suitable fracturing fluid down a well penetrating a formation and into said formation under sufficient pressure to overcome the pressure exerted by the overburden. This results in creating a crack or fracture in the formation to provide a passageway which facilitates flow of fluids through the formation and into the well. Propping agents can be included in the shear-thickening compositions of the invention if desired. Propping agents which can be used include any of those known in the art. e.g., sand grains, walnut shell fragments, tempered glass beads, aluminum pellets, and similar materials, so long as they meet the appropriate compatibility requirements. Generally speaking, it is desirable to use propping agents having particle sizes in the range of 8 to 40 mesh (U.S. Sieve Series). However, particle sizes outside this range can be employed.

A common problem in hydraulic fracturing involving the use of water-based compositions is the excessive loss of fluid to the formation. This significant loss of fluid, primarily water, to the formation, e.g., can prevent the attainment of sufficiently high pressures necessary to fracture selected zones of the formation. Fluid loss into the formation can be lessened, e.g., by adding a shear-thickening fluid such as disclosed herein. Said shear-thickening fluids can be used in fracturing or added to suitable fracturing fluids to function as fluid-loss control additives therein. Apparently, fluid-loss additives decrease the transfer of water into the formation by temporarily plugging and/or plastering the exposed faces of the more accessible channels and passages in the formation.

The synthetic resins that can be used can be prepared in accordance with known methods and generally comprise the reaction of a suitable aldehyde with a suitable phenol compound in the presence of an alkaline catalyst. The molar ratio of aldehyde to phenol is generally in the range of 0.1:1 to 2:1 with a preferred range of about 0.3:1 to 1:1. The pH maintained during the preparation of the synthetic resin is in the range of about 7 to 12, preferably in the range of about 9 to 11.

Suitable aldehydes that can be employed include those having from one to four carbon atoms such as formaldehyde, acetaldehyde, butyraldehyde, and the like. Suitable phenols include phenol, catechol, resorcinol, the cresols, and the like with the proviso that catechols are operable only in brine-containing systems. Suitable alkaline catalysts for the phenol-aldehyde condensation are selected from the alkali metal and ammonium hydroxides and carbonates with sodium hydroxide and sodium carbonate being preferred because of cost and availability.

The shear-thickening inventive composition can also be prepared by contacting the phenol, aldehyde, polyalkylene oxide under suitable conditions in an aqueous reaction medium (see Example II herein).

The synthetic resin-forming reaction mass is maintained in the broad temperature range of 100° F. to 212° F., preferably 120° F. to 180° F., for a time in the range of 5 minutes to 48 hours, preferably 10 minutes to 24 hours, and most preferably 10 minutes to one hour.

Alternatively, the shear-thickening inventive compositions can be prepared by reacting the phenolic component and aldehyde component in a thickened aqueous solution of the polyethylene oxide over a pH range of about 7 to 9. The ranges of component concentrations for such a procedure are shown below:

| Components | Concentration Ranges (ppm) | |
| --- | --- | --- |
|  | Broad | Preferred |
| Polyalkylene oxide | 1,000 to 30,000 | 5,000 to 20,000 |
| Phenolic compound | 200 to 20,000 | 500 to 10,000 |
| NaHCO$_3$ (optional) | 0 to 5,000 | 1,000 to 3,000 |
| HCHO (dry basis) | 100 to 5,000 | 1,000 to 3,000 |

As disclosed in the art, synthetic phenol-aldehyde resins are preferably and most commonly produced, e.g., by condensation of phenol and/or resorcinol with formaldehyde in aqueous alkaline solution. The specific nature of the resulting condensation product is a function of the relative amounts of phenol and formaldehyde, the reaction temperature and reaction time as well as the nature and quantity of alkaline catalyst. In regard to the instant invention, a relatively low degree of advancement or polymerization of the resulting condensation product is desired so that relatively short reaction times and lower temperatures are highly desirable. A useful resin solution exhibits a comparatively low viscosity; thus, it may be useful to monitor the viscosity of said resin-forming reaction mixture in order to obtain compositions suitable for use in the instant invention. The polymerization reaction is conveniently quenched by rapidly decreasing the temperature of the reaction mass as the viscosity thereof is in a range suitable for use in the shear-thickening fluids described herein.

The term "polyalkylene oxide polymer" as used herein is meant to include high molecular weight polyethylene oxides, polypropylene oxides, and polybutylene oxides, etc. These polyalkylene oxides can be chemically modified, desirably to obtain improved results, and the chemically modified polyalkylene oxide polymers are intended to be within the scope of this invention. The molecular weight of the polyalkylene oxide polymers is about 10,000 to 10,000,000 or more, and preferably about 600,000 to about 7,500,000, and more preferably about 4,000,000 to about 6,000,000. Lower or higher molecular weight polymers may be desired for particular purposes; but the above ranges should be suited for most applications. The preferred polyalkylene oxide is commercially available from Union Carbide Company, 270 Park Avenue, New York, NY 10017, U.S.A, under the trademarks "Polyox Coagulant" and "Polyox WSR 301."

The aqueous medium can be soft, brackish or brine water. Preferably the water is soft, but it can contain salts which are preferably characteristic of those within the subterranean formation being fractured. Where a highly viscous fluid is desired, it is preferred to use the soft water.

The amount of synthetic phenol-aldehyde resin and polyalkylene oxide polymer used will vary somewhat but will be sufficient to provide a shear-thickening composition. In general, the amount of synthetic resin will range from 0.025 to 2.5 weight percent, and the amount of polyalkylene oxide polymer will range from 0.1 to 3.0 weight percent, with the balance being water.

Any suitable method can be employed for preparing the shear-thickening compositions of the invention. It is ordinarily preferred to first dissolve or disperse the polymer in water before contracting the polymer solution with the alkaline synthetic phenol-formaldehyde resin reaction mixture. Alternatively, the phenol and formaldehyde can be reacted to form the synthetic resin in an aqueous solution containing said polyalkylene oxide, said phenol, and said aldehyde. It is within the scope of the invention to moisten or slurry the polymer with a small amount, e.g., about one to about six weight percent based on the weight of the polymer, of a low molecular weight alcohol, e.g., $C_1$ to $C_3$ alcohols, as a dispersion aid prior to dispersing the polymer in water. It is preferred that there be no undue delay between completing the preparation of the shear-thickening composition and its introduction into contact with the formation.

The shear-thickening compositions of the invention can be prepared on the surface in a suitable tank equipped with suitable mixing means, and then pumped down the well and into the formation employing conventional equipment for such shear-thickening pumping compositions. However, it is within the scope of the invention to prepare said compositions while they are being pumped down the well. This technique is sometimes referred to as "on the fly." For example, a solution of the polymer in water can be prepared in a tank adjacent the wellhead. Pumping of this solution through a conduit to the wellhead can then be started. Then, a few feet downstream from the tank, a suitable connection can be provided for introducing the synthetic phenol-formaldehyde resin reaction mixture preferably as an aqueous solution. As will be understood by those skilled in the art, the rate of introduction of said components into said conduit will depend upon the pumping rate of the shear-thickening composition through said conduit. Mixing orifices can be provided in said conduit, if desired.

It is within the scope of the invention to precede the injection of shear-thickening composition into the well and out into the formation with a preflush of a suitable cooling fluid, e.g., water. Such fluids serve to cool the well tubing and formation and extend the useful operating temperature range of said compositions. The volume of said cooling fluid so injected can be any suitable volume sufficient to significantly decrease the temperature of the formation being treated and can vary depending upon the characteristics of the formation. For example, amounts up to 20,000 gallons or more can be used to obtain a temperature decrease in the order of 100° F. to 250° F.

The following examples will serve to further illustrate the invention, but they should not be considered as unduly limiting on the invention.

EXAMPLE I

A low molecular weight phenol-aldehyde synthetic resin was prepared by placing a charge of 5 g (0.045 mol) resorcinol, 4.3 g (0.046 mol) phenol, and 3.7 g (0.092 mol) sodium hydroxide in 50 ml water and heating to 130° F. to effect solution. A 3.4 ml (0.046 mol) HCHO sample of 37 weight percent formalin solution was added, and the temperature of the reaction mass was increased to 175° F. and maintained at that temperature for 15 minutes. The reaction mixture was cooled to room temperature, and one-fifth of this mixture was added to a 250 ml portion of an aqueous solution of polyethylene oxide (5,000 ppm of Union Carbide's Polyox WSR 301). This inventive composition was tested with a Model 35 Fann Viscosmeter, and the results are shown in Table I to illustrate to shear-thickening character of the inventive composition.

TABLE I

Viscosity Measurements in a Shear-Thickening Composition

| Viscosity (cp) at Shear Rate sec$^{-1}$ | | | | |
|---|---|---|---|---|
| 10.2 | 171 | 342 | 511 | 1022 |
| NR$^a$ | 21 | 18 | 17 | 125+ |

$^a$Nr represents not recorded.

The high viscosity value of 125+ cp at a shear rate of 1022 sec$^{-1}$ demonstrates the shear-thickening character of the inventive composition and indicates the potential usefulness of such inventive compositions as oil well treatment fluids.

EXAMPLE II

An inventive shear-thickening composition was prepared in aqueous solution at a pH of 7.6 by combining the following components in the indicated quantities: polyethylene oxide (WSR 301), 15,000 ppm; resorcinol, 1,000 ppm; NaHCO$_3$, 2,000 ppm; and HCHO (as formalin), 2,000 ppm; and the aging this mixture for 24 hours at 125° F. The shear-thickening character of this inventive composition was verified by testing in a Stormer viscometer. Such a composition is potentially useful as an oil well treatment fluid.

I claim:

1. A process for hydraulically fracturing a subterranean formation penetrated by at least one well which comprises
    injecting into the formation at a pressure sufficient to fracture the formation an aqueous shear-thickening composition containing as essential ingredients:
        (a) a small but effective amount in the range of 0.1 to 3 weight percent of a high molecular weight polyalkylene oxide selected from the group consisting of polyethylene oxides, polypropylene oxides, and polybutylene oxides having a molecular weight of about 10,000 to about 10,000,000 and
        (b) a small but effective amount in the range of 0.025 to 2.5 weight percent of a synthetic resin comprising the reaction product formed by heating an aqueous alkaline mixture of an aldehyde having from one to four carbon atoms and a phenol compound selected from the group consisting of phenol, catechol, resorcinol and cresol at a reaction temperature in the range of 100° F. to 212° F. for a period of time in the range of 5 minutes to 48 hours and a molar ratio of aldehyde to phenol in the range 0.1:1 to 2:1 and a pH of about 7 to 12,
    the amounts of (a) and (b) being sufficient to form a shear-thickening composition that is fluid in a quiescent state but becomes gel-like in character on agitation, and
        (c) the balance of the composition being water
    maintaining said composition in said formation in contact therewith for a period of time sufficient to significantly increase formation permeability and fracturing said formation to stimulate the production of fluids therefrom.

2. A process according to claim 1 wherein (a) has a molecular weight range of 600,000 to 7,500,000.

3. A process according to claim 1 wherein a propping agent is incorporated into said aqueous shear-thickening composition.

4. A process according to claim 1 wherein a cooling fluid is injected into the formation to reduce the temperature of the formation prior to introduction of said aqueous shear-thickening composition.

5. A process according to claim 1 wherein
    (a) is a polyethylene oxide and
    (b) is the reaction product formed from formaldehyde and phenol.

6. A process according to claim 1 wherein
    (a) has a molecular weight range of 4,000,000 to 6,000,000 and
    (b) is a synthetic resin formed by heating a mixture of formaldehyde and phenol or resorcinol.

* * * * *